United States Patent [19]
Tsurumi et al.

[11] Patent Number: 5,834,910
[45] Date of Patent: Nov. 10, 1998

[54] AC MOTOR CONTROLLING APPARATUS

[75] Inventors: Takafumi Tsurumi; Naoki Ohsawa; Hajime Kondou; Yasumichi Ohnuki, all of Saitama, Japan

[73] Assignee: Honda Giken Kogyo Kabushiki Kaisha, Tokyo, Japan

[21] Appl. No.: 903,064

[22] Filed: Jul. 30, 1997

[30] Foreign Application Priority Data

Aug. 23, 1996 [JP] Japan .................................... 8-239942

[51] Int. Cl.⁶ ...................................................... B60L 9/16
[52] U.S. Cl. ........................ 318/139; 318/801; 318/811; 318/432
[58] Field of Search .................................. 318/139, 432, 318/727, 798–801, 810, 811

[56] References Cited

U.S. PATENT DOCUMENTS

| | | | |
|---|---|---|---|
| 4,335,337 | 6/1982 | Okamatsu et al. | 318/52 |
| 4,338,558 | 7/1982 | Okamatsu et al. | 318/802 |
| 5,227,703 | 7/1993 | Boothe et al. | 318/139 |
| 5,442,268 | 8/1995 | Goodarzi et al. | 318/432 |
| 5,686,807 | 11/1997 | Kusano et al. | 318/808 |

FOREIGN PATENT DOCUMENTS 08-308003  11/1996  Japan .
9-130902   5/1997   Japan .

*Primary Examiner*—Bentsu Ro
*Attorney, Agent, or Firm*—Nikaido, Marmelstein, Murray & Oram LLP

[57] ABSTRACT

An AC motor controlling apparatus which can exactly control the torque of an AC motor throughout a motor rotating speed range from low to high.

A control mode selecting circuit 13 actuates a switching circuit 19 for allowing an exciting circuit 12 to receive a PWM signal S11 from a current feedback circuit 11 when the rotating speed Nm of the motor 1 is in a higher range, and a PWM signal from an AND gate 14 when it is in a lower range. A power feedback circuit 10 performs a feedback control for matching the power supplied to an inverter circuit 6 to a target power. The current feedback circuit 11 performs a feedback control for matching the phase currents to a target currents.

6 Claims, 7 Drawing Sheets

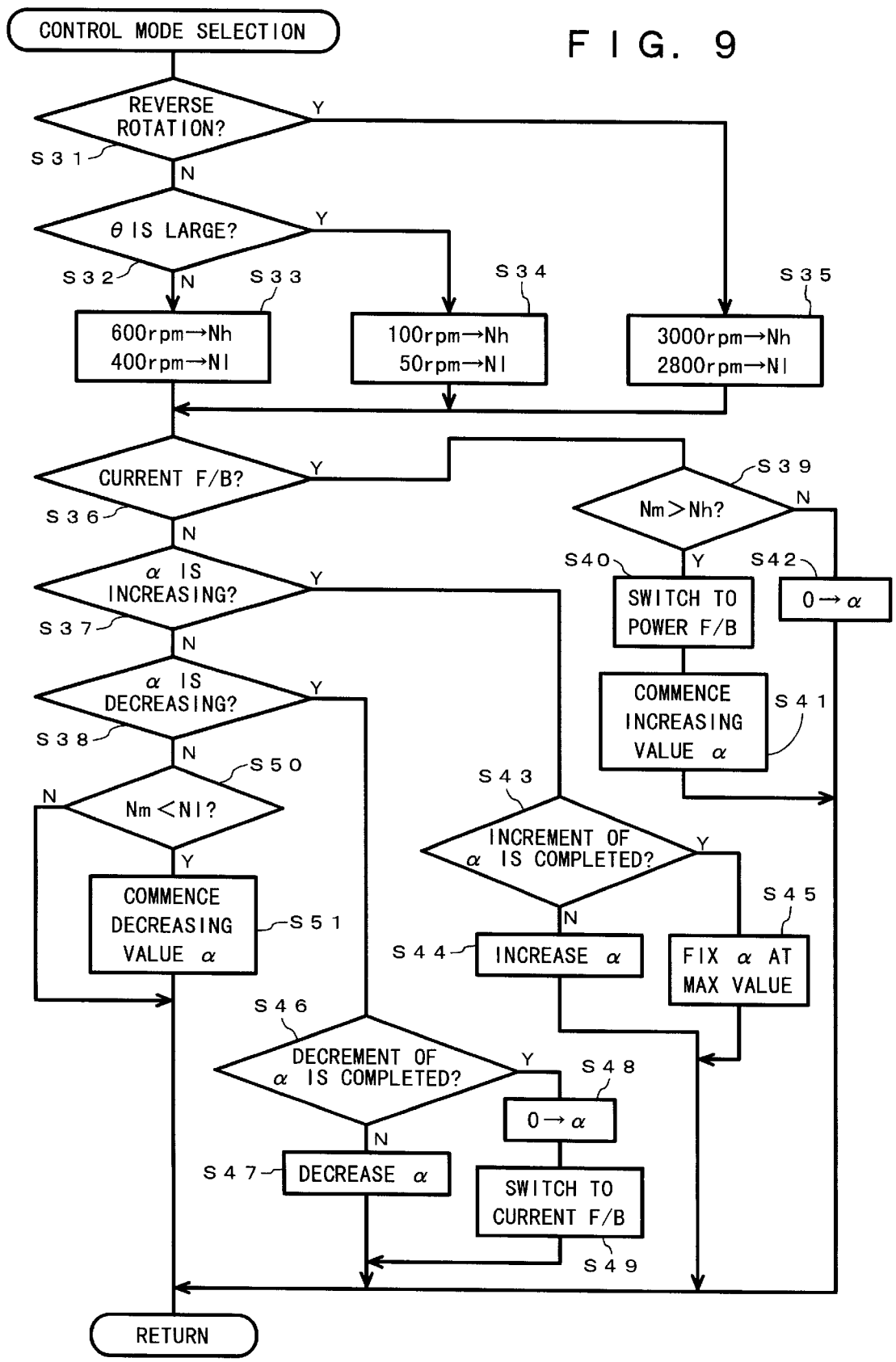
F I G. 9

AC MOTOR CONTROLLING APPARATUS

BACKGROUND OF THE INVENTION

1. Field of the Invention

The present invention relates to an AC motor controller apparatus and particularly, an AC motor controlling apparatus for controlling the operation of an AC motor used for driving an electric vehicle.

2. Description of the Related Art

Three-phase AC motors have widely been used as drive motors for various electric vehicles including an electric car and an electric bicycle. In an electric vehicle driven by such an AC motor, when an accelerator pedal is operated by a driver, its operating angle is consulted to calculate a torque command value (a target torque). A motor controller performs a torque control operation for allowing the actual torque of the motor to coincide with the torque command value. Accordingly, the output of the motor is controlled according to the accelerator operating angle. The torque control is substantially classified into a power feedback control method as disclosed in, for example, the specification of the Japanese Patent Application No. H7-105434 and a current feedback control method as disclosed in, for example, the specification of the Japanese Patent Application No. H7-310066.

In the power feedback control method, the actual torque of a motor is measured on the basis of a power supplied to the motor. As shown in FIG. 4, in response to a desired running speed determined as the accelerator operating angle θ by a driver, a power feedback circuit 10a calculates a torque command value on the basis of the accelerator operating angle θ and the rotating speed Nm of the motor 1 and delivers it as a target power. The target power is compared with an actual power which is calculated using an input current Iin and an input voltage Vin supplied from a battery 3 to an inverter circuit 6 and a conversion rate of the inverter circuit 6. The inverter circuit 6 is feedback controlled by the power feedback circuit 10a so that the actual power coincides with the target power.

In the current feedback control, the actual torque of a motor is measured on the basis of a phase current in the motor. As shown in FIG. 5, upon a driver determining a running speed as the accelerator operating angle θ, a current feedback circuit 11a calculates a torque command value using the accelerator operating angle θ and delivers it as a target current. The target current is compared with actual phase currents IU, IV and IW of the motor 1 which are at exciting timing as judged from magnetic pole signals SU, SV and SW. An inverter circuit 6 is then feedback controlled by the current feedback circuit 11a so that the phase currents match the corresponding target currents, respectively.

The power feedback control is rather simple and permits the efficient control of the motor rpm at a higher speed range. However, it has to deal with a very small power at a lower speed range hence yielding possible errors and declining the accuracy of torque control.

The phase current feedback control allows a phase current proportional to the torque to be directly controlled thus providing highly accurate torque control. However, it is necessary for direct control of the phase current which is an AC signal to require high-speed arithmetical operations in a high speed range. Also, in case that a field-weakening control where the phase current contains a field current component for generating a reverse magnetic field opposite to the field imposed by permanent magnets of the AC motor is used for more increasing the motor rpm in a high speed range, the torque current will be separated from the field-weakening current and measured with much difficulty, resulting in inaccuracy of the torque control. It is not easy in the conventional feedback control methods to consistently provide an accurate torque control on the AC motor in an overall speed range from its very low revolution to very high revolution.

Moreover, the feedback control with the current feedback circuit 11a requires a selecting means installed in the current feedback circuit 11a or separately, for selecting a phase current in each phase of the AC motor which is to be compared with the target current at the exciting timing which has been detected on the basis of the magnetic pole signals SU, SV and SW, hence making the overall circuitry arrangement intricate.

SUMMARY OF THE INVENTION

It is an object of the present invention to provide an AC motor controlling apparatus having a simple construction for exactly controlling the torque of an AC motor throughout a rotating speed range from low to high.

AC motor controlling apparatus comprises a means for detecting a DC power supplied to an inverter circuit supplying an AC power to the AC motor; a means for detecting phase currents distributed from the inverter circuit to the AC motor; a means for detecting the number of rotations of the AC motor; a first signal generating means for generating a first control signal to reduce a deviation of the detected phase current from a target current: a second signal generating means for generating a second control signal to reduce a deviation of the detected DC power from a target power: a first selecting means for selecting the first control signal when the rotating speed of the AC motor is in a lower range and the second control signal when the rotating speed is in a higher range; and a controlling means responsive to a selected one of the first and the second control signals for controlling the power and current supplied to the AC motor.

According to the present invention, when the number of rotations of the AC motor is rather low, the current feedback control is selected for accurately controlling the torque in a lower speed range and when it is rather high, the power feedback control is selected for accurately controlling the torque in a higher speed range. As the result, the torque control will correctly be carried out throughout the rotating speed range of the motor from lower to higher.

The means for detecting the phase currents detects in sequence exciting currents at their respective timing in each phase of the AC motor and combining them to a composite current which is defined as the phase current. This allows no need of the selecting means for selecting the phase current to be compared with the target torque (a target current) at the exciting timing of the phase, thus contributing to the simple circuitry arrangement of the AC motor controlling apparatus.

BRIEF DESCRIPTION OF THE DRAWINGS

FIG. 9 is a flowchart showing the operation of a control mode selecting circuit.

DETAILED DESCRIPTION OF THE PREFERRED EMBODIMENT

Figure 1:
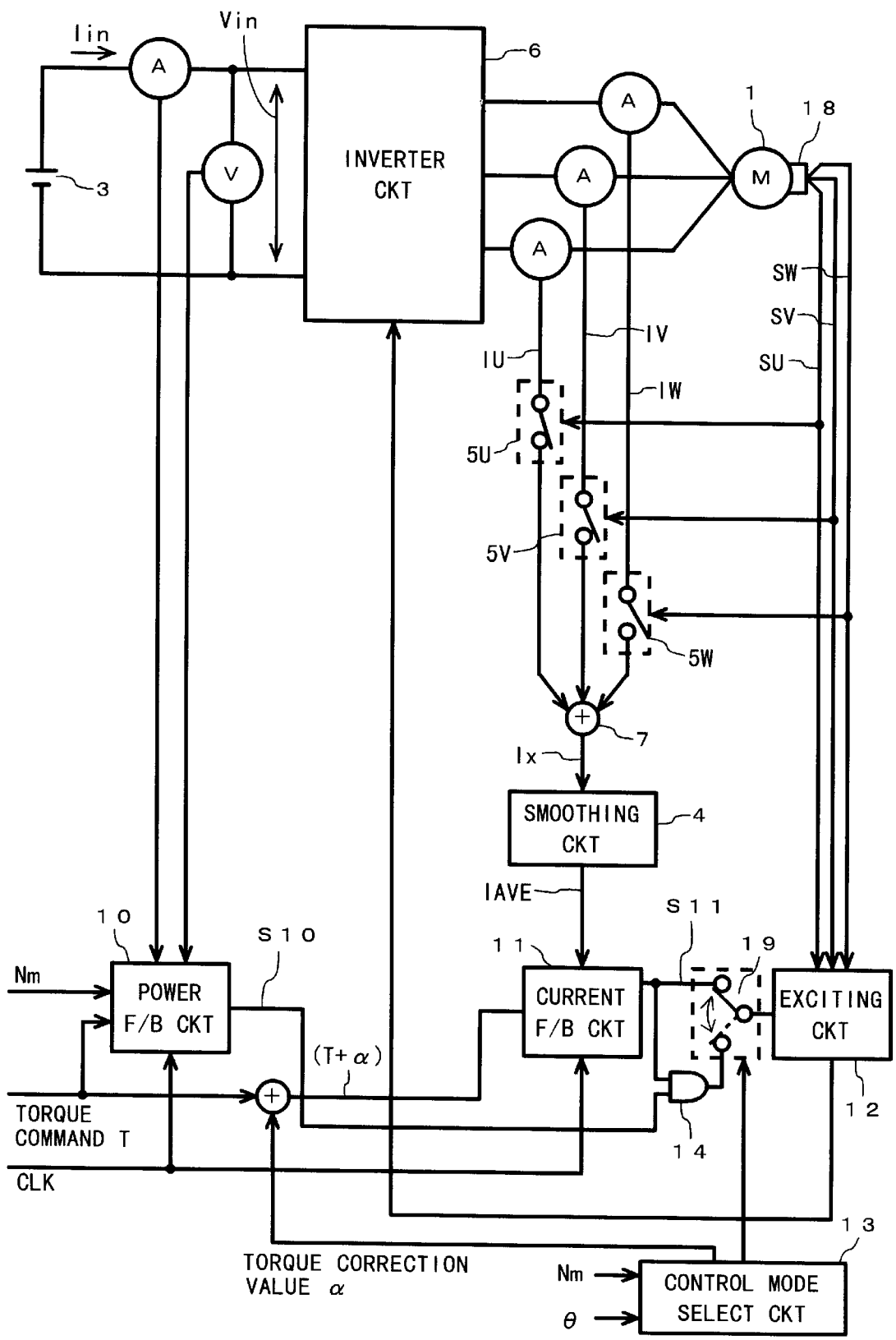
FIG. 1 is a block diagram showing one embodiment of the present invention.
Figure 4:
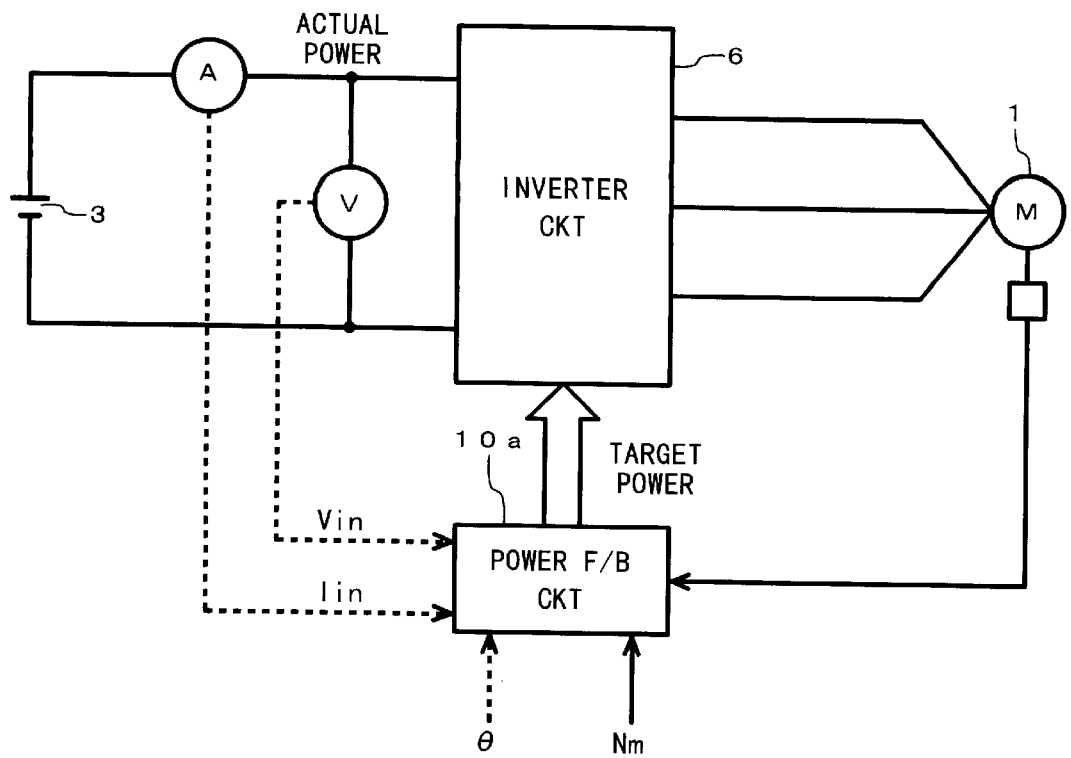
FIG. 4 is a block diagram of a conventional power feedback circuit.
Figure 5:
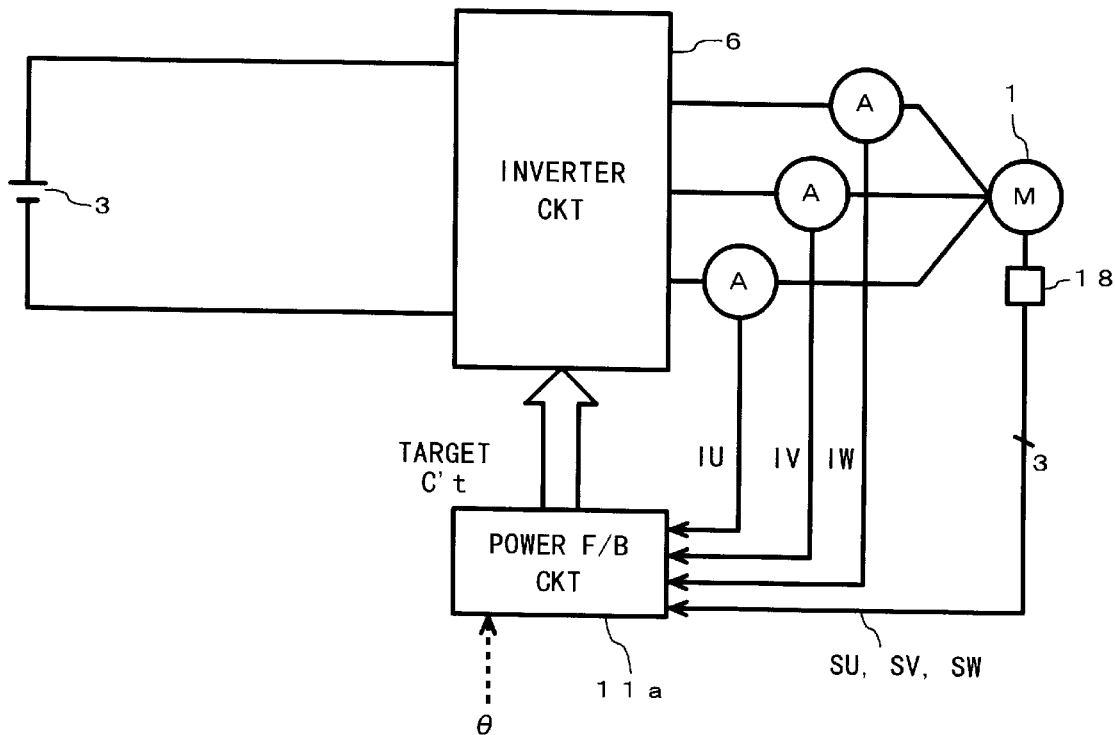
FIG. 5 is a block diagram of a conventional current feedback circuit.

The present invention will now be described in more detail referring to the accompanying drawings. FIG. 1 is a block diagram of an AC motor controlling apparatus showing one embodiment of the present invention, in which like components are denoted by like numerals as those shown in FIGS. 4 and 5.

A power feedback circuit 10 (commonly in a computer) is provided for comparing a target power, which is a product of the torque command value T calculated on the basis of an accelerator operating angle and the rpm of a motor Nm, with an actual power determined using an input current Iin and an input voltage Vin supplied to an inverter circuit 6 and the conversion rate of the inverter circuit 6. When the actual power thus detected is smaller than the target power, the duty ratio of an output or PWM (pulse width modulation) signal S10 of the power feedback circuit 10 is increased, while when greater, it is decreased. The power feedback circuit 10 is fed with a reference clock CLK and allows the PWM signal S10 to be synchronized at its rising or decay edge with the reference clock CLK.

Figure 8:
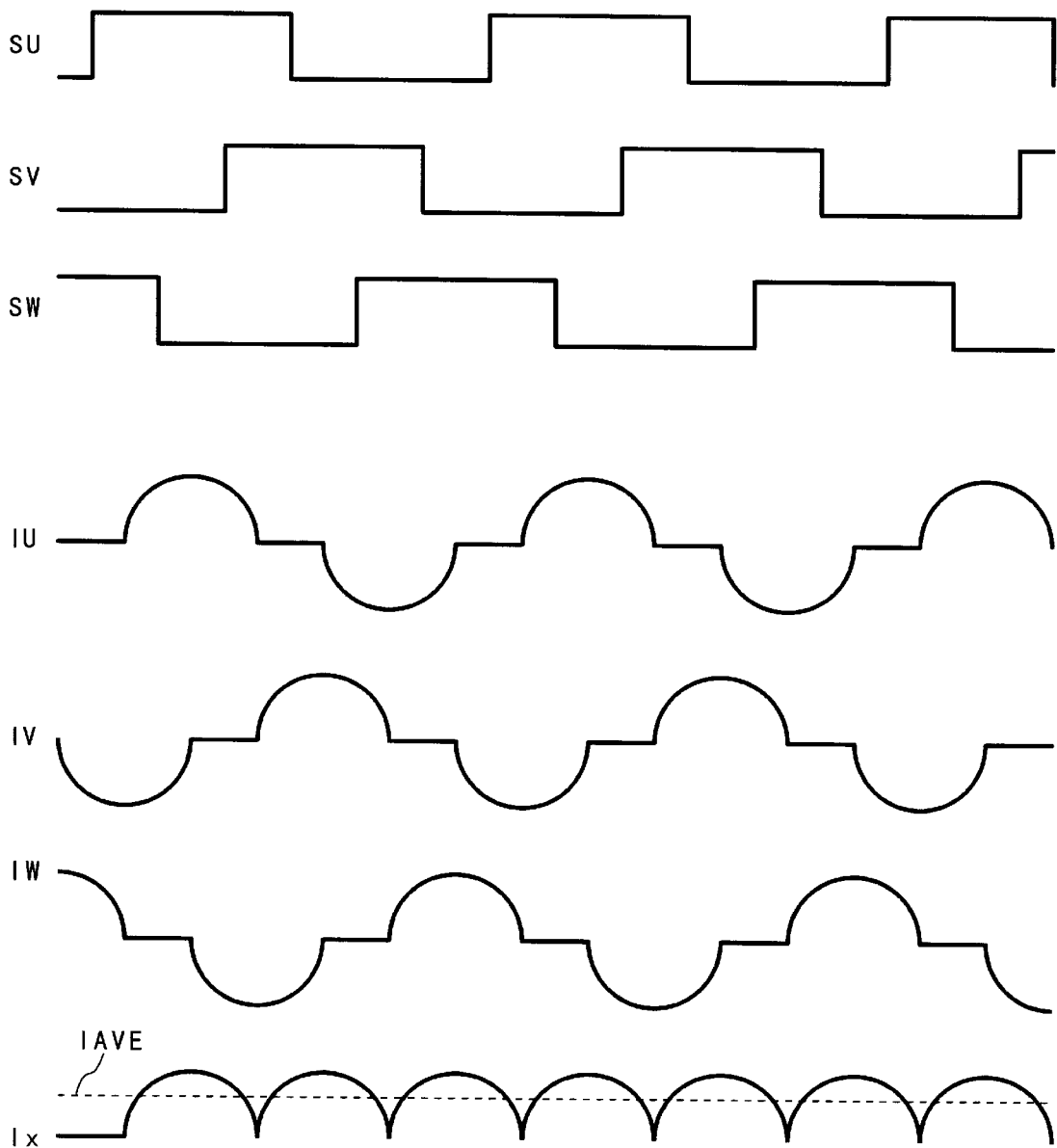

A current feedback circuit 11 is provided for comparing between a target current, which is a sum (T+α) of the torque command value T and a torque correction value a, and an actual value (IAVE) of the phase current supplied to each phase of the motor 1. As compared with the conventional phase current detecting method described above with referring to FIG. 5, this embodiment permits the magnetic pole signals SU, SV and SW detected by a rotating position sensor 18 to actuate switching elements 5U, 5V and 5W, respectively, for transmitting a series of phase currents IU, IV and IW in a sequence at such a timing that the phases are magnetized with the same polarity. The phase currents IU, IV, and IW are then combined together along a time axis by an adder circuit 7, as shown in FIG. 8 which is described later. A composite phase current Ix is smoothed by a smoothing circuit 4 and released as an actual value IAVE of the phase current. Since the composite phase current Ix represents each of the phase currents IU, IV and IW, conventional means for determining the exciting timing on the basis of the magnetic pole signals SU, SV and SW and for selecting one of the phase currents IU, IV and IW according to the result of timing determination are not needed. Therefore, the overall circuitry arrangement of the embodiment will be simplified.

When the phase current IAVE is smaller than a target current, the duty ratio of a PWM signal output S11 of the current feedback circuit 11 is increased from its current duty ratio. If not, it is decreased. The current feedback circuit 11 is also supplied with the reference clock CLK and the PWM signal S11 is synchronized at its rise (or decay) edge with the reference clock CLK. Upon detecting the exciting phase of the AC motor 1 in response to the magnetic pole signals SU, SV and SW measured by the rotating position sensor 18, an exciting circuit 12 actuates the inverter circuit 6 for feeding to the detected exciting phase of the motor 1 with a power corresponding to the PWM signal from either the current feedback circuit 11 or an AND gate 14.

A control mode selecting circuit 13 is provided for outputting the correction value α to be added to the torque command value T and selecting the PWM signal to be supplied to the exciting circuit 12 through reading the rotating speed Nm of the AC motor 1 and the accelerator operating angle θ, as will be explained later in more detail. When the rotating speed Nm of the motor 1 is smaller than a given value defined as a function of the accelerator operating angle θ, the control mode selecting means 13 actuates a switching circuit 19 for selecting the PWM signal from the current feedback circuit 11. When not smaller but greater, it selects the PWM signal from the AND gate circuit 14. The AND gate circuit 14 receives the two PWM signals S10 and S11 from the power 10 and the current feedback circuit 11 respectively and selectively releases one of them which is smaller in the duty ratio as will be explained later.

Figure 2:
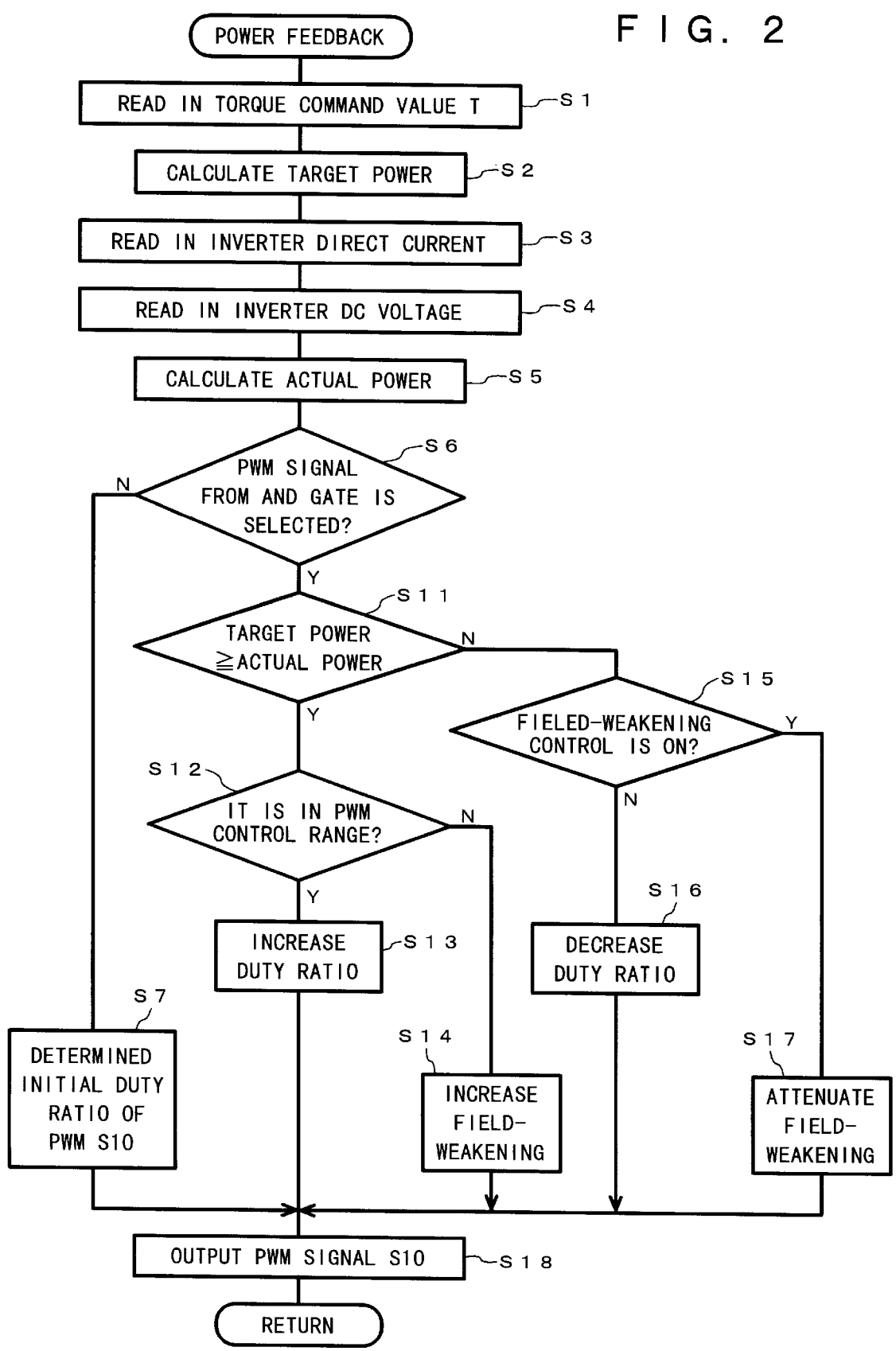
FIG. 2 is a flowchart showing the operation of a power feedback circuit.

The operations of the power feedback circuit 10 will be explained in more detail referring to the flowchart of FIG. 2. At Step S1, the torque command value T is read in and at Step S2, the target power is calculated on the basis of the torque command value T using a known method. At Step S3, the direct current Iin supplied to the inverter circuit 6 is read in and at Step S4, the DC voltage Vin applied to the inverter circuit 6 is obtained. At Step S5, the actual power is calculated using the direct current Iin, the DC voltage Vin, and the conversion rate of the inverter circuit 6.

This is followed by Step S6 where it is examined whether or not the PWM signal from the AND gate 14 is connected by the switching circuit 19, i.e. the power feedback mode is selected or not. If the output of the AND gate 14 is not selected, it is judged that the current feedback mode is selected and the procedure goes to Step S7. At Step S7, an initial duty ratio of the PWM signal S10 is determined by the power feedback circuit 10. More particularly, the power feedback circuit 10 predicts the duty ratio of the current PWM signal S11 of the current feedback circuit 11 based on the target power and sets the initial duty ratio of the PWM signal S10 greater than the predicted duty ratio of the PWM signal S11. Alternatively, the power feedback circuit 10 may detect an actual duty ratio of the current PWM signal S11 and set the initial duty ratio of the PWM signal S10 greater than the actual duty ratio of the PWM signal S11.

When it is judged at Step S6 that the PWM signal from the AND gate circuit 14 is selected, the procedure goes to Step S11 where the target power and the actual power are compared from each other. When the actual power is equal to or smaller than the target power, the procedure advances to Step S12 where it is examined whether the PWM control is eligible or not. When the duty ratio of the PWM signal S10 is smaller than 100%, i.e. it is in the PWM control range for improving the duty ratio, the procedure moves to Step S13 where the duty ratio is increased. If the duty ratio is 100% and no more improvement or increment is permitted, the procedure goes to Step S14 where a rate of field-weakening is increased.

When it is judged at Step S11 that the actual power is higher than the target power, the procedure moves to Step S15 where it is examined whether or not the field-weakening control is in operation. When yes, the procedure goes to Step S17 where the field-weakening is attenuated. If not, the procedure moves to Step S16 where the duty ratio is decreased. At Step S18, the PWM signal S10 having the duty ratio determined in the above steps is output.

Figure 3:
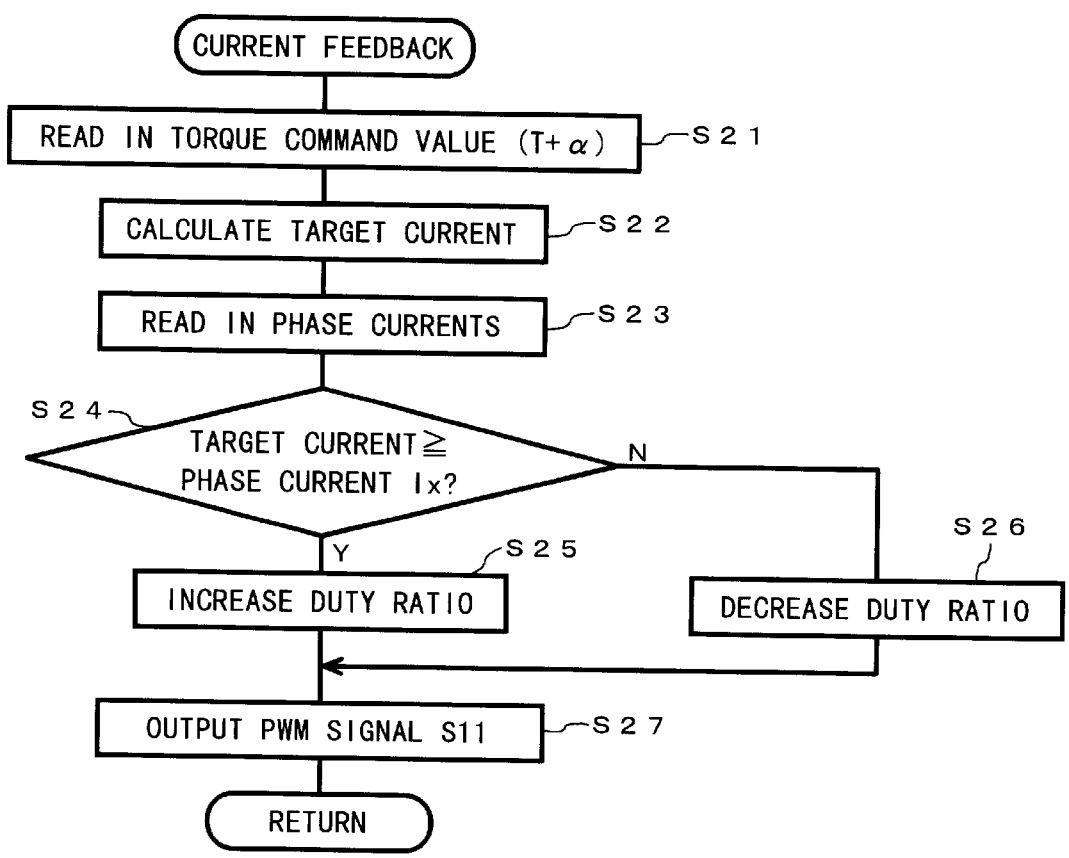
FIG. 3 is a flowchart showing the operation of a current feedback circuit.

The operations of the current feedback circuit 11 will be explained in more detail referring to the flowchart in FIG. 3. At Step S21, the torque command value (T+α) is received and at Step S22, the target current is calculated on the basis of the torque command value (T+α). At Step S23, the actual phase currents IU, IV and IW supplied from the inverter circuit 6 to the phases of the motor 1 are measured and combined to issue the phase current Ix and at Step S24, the target current is compared with the phase current. When the phase current Ix is equal to or smaller than the target current, the procedure goes to Step S25 where the duty ratio of the PWM signal S11 is increased. If not smaller but greater, the procedure moves to Step S26 for attenuating the duty ratio. At Step S27, the PWM signal having the duty ratio determined in those steps is output.

Figure 6:
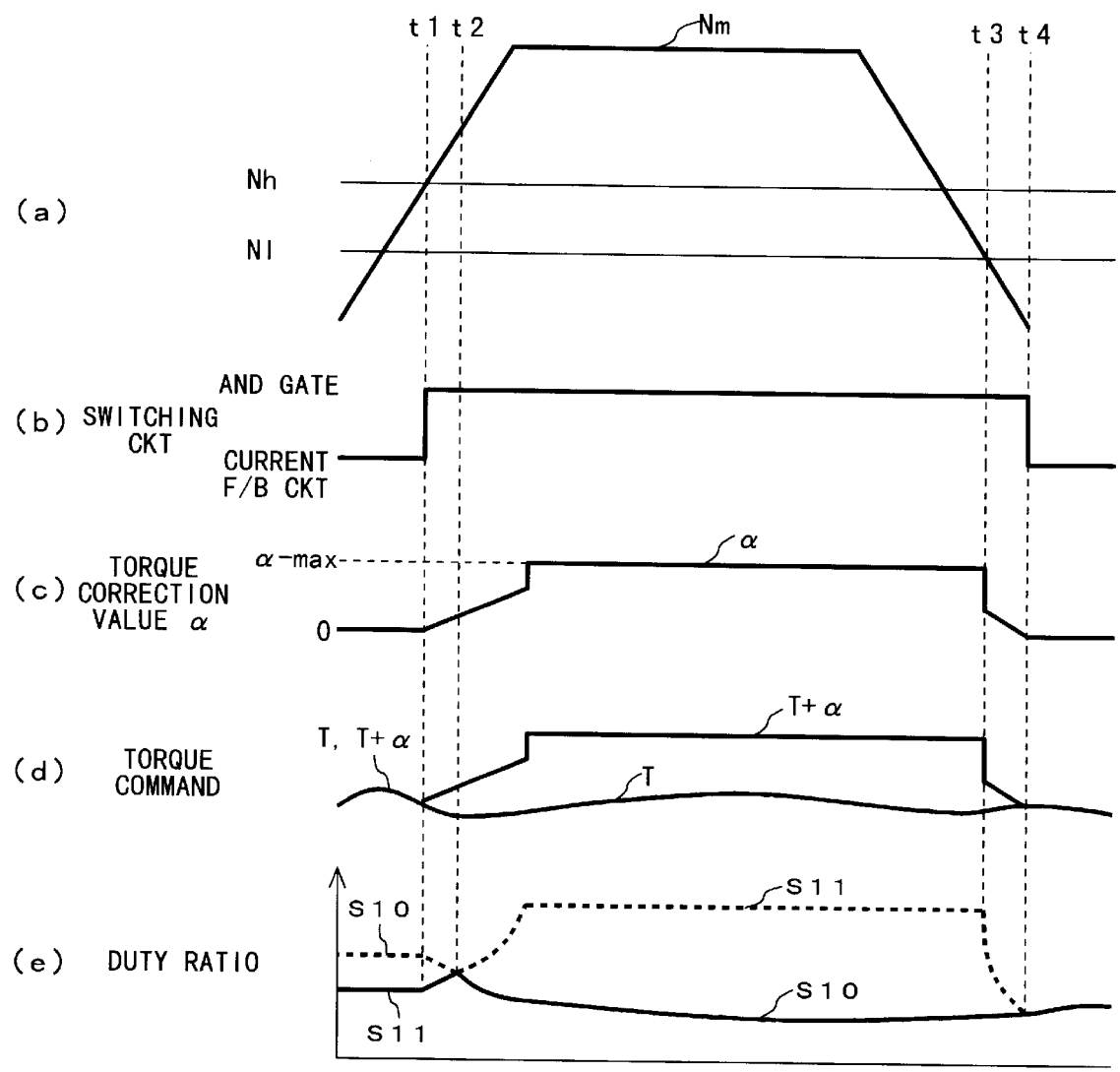
FIGS. 6 to 8 are, respectively, diagrams of signal waveforms at primary parts of the circuit shown in FIG. 1.

The embodiment of the present invention will be explained in more detail referring to the timechart shown in FIG. 6 and the flowchart of the control mode selecting circuit 13 shown in FIG. 9.

As the accelerator is depressed by a driver, when an electric car does not run, the torque command value T calculated based on its operating angle θ and the current rotating speed Nm of the motor 1 is given. The torque command value T is directly supplied to the power feedback circuit 10, but its addition with the torque correction α shown in FIG. 6(c) is fed as (T+α) to the current feedback circuit 11.

At Step S31, it is examined by the control mode selecting circuit 13 whether or not the motor 1 rotates in a reverse direction. In the reverse rotation, a lower rotating speed Nm may degrade the accuracy of the power feedback control. When the reverse rotation is detected, the procedure moves to Step S35 where the first Nh and the second reference rotating speed NI are set to 3000 rpm and 2800 rpm, respectively, for expanding the current feedback control range. When it is judged that the motor rotation is in the forward direction, the procedure goes to Step S32 where it is examined for improvement of the control stability whether the accelerator operating angle θ is large or not. When the angle θ is large, the first Nh and the second reference rotating speed NI are set to 100 rpm and 50 rpm, respectively, at Step S34. If the accelerator operating angle θ is not large, the procedure goes to Step S33 where the first Nh and the second reference rotating speed NI are set to 600 rpm and 400 rpm respectively.

The motor rotating speed Nm is less than the first reference rotating speed Nh just after starting as shown in FIG. 6(a), and the control mode selecting circuit 13 actuates the switching circuit 19 for feeding the PWM signal S11 from the current feedback circuit 11 to the exciting circuit 12 as shown in FIG. 6(b). This allows the feedback control to be performed by the current feedback circuit 11. At that time, the duty ratio of the PWM signal S10 from the power feedback circuit 10 is set to a value greater than that of the current PWM signal S11 at Step S7 (FIG. 2). More specifically, while the current feedback circuit 11 is selected by the switching circuit 19, the duty ratio of the PWM signal S10 remains greater than that of the PWM signal S11 as shown in FIG. 6(e).

When the reference rotating speeds Nh and Ni have been determined by the control mode selecting circuit 13, it is examined whether the current feedback control is in operation or not at Step S36. As the rotating speed Nm is low enough in the beginning and the current feedback control is selected, the procedure moves to Step S39 where the current rotating speed Nm is compared with the first reference rotating speed Nh. Before the time t1 in FIG. 6, the rotating speed Nm is lower than the first reference rotating speed Nh and the procedure goes to Step S42 where the correction value α is set to zero. Accordingly, the torque command values T and (T+α) are identical to each other as shown in FIG. 6(d). The feedback circuits 10 and 11 produce and deliver their respective PWM signals S10 and S11 in response to the input torque command values.

When the current rotating speed Nm exceeds the first reference rotating speed Nh at the time t1, the procedure assigned to the control mode selecting circuit 13 moves through Steps S36 and S39 to Step S40. At Step S40, the switching circuit 19 is switched for allowing the exciting circuit 12 to receive the output of the AND gate 14 as shown in FIG. 6(b). This is followed by Step S41 for starting increasing the correction value α by a given increment. The increment of the correction value α may be appropriately determined so that a change in the torque is minimized when the feedback control is shifted from the current feedback control with the PWM signal S11 to the power feedback control with the PWM signal S10.

Figure 7:
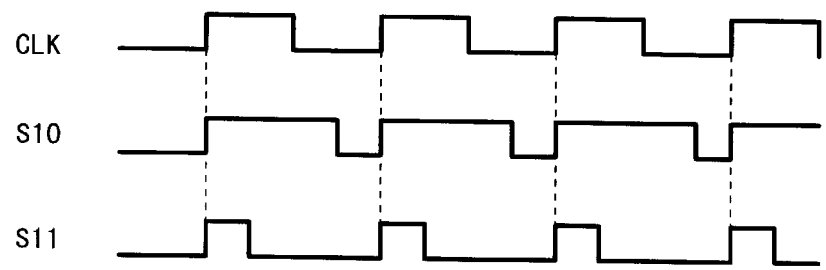

The AND gate circuit 14 delivers a logic AND signal of the PWM signals S10 and S11. Since the both PWM signals S10 and S11 are synchronized with the reference clock CLK as shown in FIG. 7, the PWM signal S11 from the AND gate circuit 14 having a small duty ratio is output from the AND gate 14 before the time t2. Consequently, after the switching operation, the feedback control with the current feedback circuit 11 is substantially continued.

In the power feedback circuit 10, the procedure moves from Step S6 to Step S11 after the switching operation. This allows the PWM signal S10 to be released having a controlled duty ratio determined on the basis of the comparison between the actual power and the target power. As described previously, the initial duty ratio of the PWM signal S10 is set to a greater rate at Step S7. Thus, it will gradually decrease with the control being progressed corresponding to the result of the comparison as shown in FIG. 6(e).

When the motor rotating speed Nm becomes greater than the first reference rotating speed Nh, the procedure in the control mode selecting circuit 13 is shifted through Steps S37 and S43 to Step S44 where the torque correction α is increased. Accordingly, the duty ratio of the PWM signal S11 from the current feedback circuit 11 starts increasing. When the two PWM signals are turned opposite to each other in the magnitude of the duty ratio at t2, the output of the AND gate circuit 14 shifts from the PWM signal S11 to the PWM signal S10 of the power feedback circuit 10. Thereafter, the control with the power feedback circuit 10 is carried out. When it is judged at Step S43 in the control mode selecting circuit 13 that the increment of the correction value α is completed, the procedure goes to Step S45 where the correction value is fixed at its maximum α-max. The value α-max may be determined, in advance, so that the PWM signal S10 is not greater than the PWM signal S11 during the power feedback control.

In the embodiment, when the switching circuit 19 is connected to the AND gate circuit 14, the duty ratio of the PWM signal S10 gradually declines, while the duty ratio of the PWM signal S11 gradually increases. The feedback control is carried out using one of the two PWM signals S10 and S11 which is smaller in the duty ratio. This prevents abrupt torque change which may occur when the control is shifted from the current feedback control to the power feedback control, thus yielding a smooth accelerating operation.

When it is judged at Step S50 in the control mode selecting circuit 13 that the motor rotating speed Nm is gradually decreased and becomes smaller than the second reference rotating speed N1 at the time t3, the procedure advances to Step S51 where the decrement of the correction value α is started. In response to the starting the decrement, the duty ratio of the PWM signal S11 from the current feedback circuit 11 is gradually decreased. When the correction value α is close to zero at the time t4 and the completion of the gradual decrement is detected at Step S46 in the control mode selecting circuit 13, the procedure goes to Step S48 where the torque correction α is turned to zero. Then, Step S49 follows for switching the switching circuit 19 to connect the current feedback circuit 11. As the result, the feedback control is performed with the current feedback circuit 11.

As set forth above, the embodiment of the present invention permits, the current feedback control which can precisely control the motor torque in the lower rotating speed range when the motor is in a lower rotating speed range and, the power feedback control which can precisely control the motor torque in the higher rotating speed range when the motor is in a higher rotating speed range. Accordingly, the torque control will exactly be carried out throughout a rotating speed range of the motor from low to high.

What is claimed is:

1. An AC motor controlling apparatus comprising:
   an inverter circuit for converting an incoming DC power to an AC power and distributing it to each exciting phase of an AC motor at predetermined timing;
   means for detecting the DC power supplied to the inverter circuit;
   means for detecting phase currents distributed from the inverter circuit to the AC motor;
   means for detecting the number of rotations of the AC motor;
   first signal generating means for generating a first control signal to reduce a deviation of the detected phase current from a target current;
   second signal generating means for generating a second control signal to reduce a deviation of the detected DC power from a target power;
   first selecting means for selecting the first control signal when the rotating speed of the AC motor is in a lower range and the second control signal when the rotating speed is in a higher range; and
   controlling means responsive to a selected one of the first and the second control signals for controlling the power and current supplied to the AC motor.

2. An AC motor controlling apparatus according to claim 1, wherein the means for detecting the phase currents detects in sequence exciting currents at their respective exciting timing in each phase of the AC motor and composing them along the time axis to produce a composite current which is used as the phase current.

3. An AC motor controlling apparatus comprising:
   an inverter circuit for converting an incoming DC power to an AC power and distributing it to each exciting phase of an AC motor at predetermined timing;
   means for detecting the DC power supplied to the inverter circuit;
   means for detecting phase currents distributed from the inverter circuit to the AC motor;
   means for detecting the number of rotations of the AC motor;
   correction value generating means for outputting a torque correction value;
   adder means for adding the torque correction value to a target torque and outputting a sum of them as a corrected torque;
   third signal generating means for generating a third control signal to reduce a deviation of an actual torque expressed by the detected phase current from the corrected torque;
   fourth signal generating means for generating a fourth control signal to reduce a deviation of an actual torque expressed by the detected DC power from a target torque;
   lower value selecting means for outputting a lower one of the third and fourth control signals as a fifth control signal;
   second selecting means for selecting the third control signal when the rotating speed of the AC motor is in a lower range and the fifth control signal when the rotating speed is in a higher range; and
   controlling means responsive to the selected control signal for controlling the power and current supplied to the AC motor.

4. An AC motor controlling apparatus according to claim 3, wherein the second selecting means selects the third control signal until the rotating speed of the AC motor exceeds a first reference speed, while the fifth control signal when it has exceeded the first reference speed.

5. An AC motor controlling apparatus according to claim 3, wherein the torque correction value is gradually increased when the rotating speed of the AC motor is higher than a first reference speed, while decreased when it is lower than a second reference speed which is smaller than the first reference speed.

6. An AC motor controlling apparatus according to claim 5, wherein the second selecting means selects the fifth control signal until the rotating speed of the AC motor becomes lower than the second reference speed, while the third control signal when it is lower than the second reference speed and the torque correction value is minimized.

* * * * *